(12) United States Patent
Irie

(10) Patent No.: US 8,312,403 B2
(45) Date of Patent: Nov. 13, 2012

(54) METHOD OF ACHIEVING CONVERGENCE OF HOLD TIME ERROR, DEVICE AND PROGRAM THEREFOR

(75) Inventor: Kazuyuki Irie, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 555 days.

(21) Appl. No.: 12/585,629

(22) Filed: Sep. 21, 2009

(65) Prior Publication Data

US 2010/0077271 A1    Mar. 25, 2010

(30) Foreign Application Priority Data

Sep. 22, 2008   (JP) ................................ 2008-242957

(51) Int. Cl.
*G06F 17/50* (2006.01)

(52) U.S. Cl. ........ 716/113; 716/104; 716/108; 716/114; 716/134

(58) Field of Classification Search .............. 716/104, 716/108, 110, 111, 113, 114, 132, 134; 714/744
See application file for complete search history.

(56) References Cited

U.S. PATENT DOCUMENTS

| | | | |
|---|---|---|---|
| 6,311,148 B1* | 10/2001 | Krishnamoorthy | 703/19 |
| 6,546,531 B1* | 4/2003 | Quach et al. | 716/114 |
| 6,557,150 B1* | 4/2003 | Honmura et al. | 716/113 |
| 6,640,330 B1* | 10/2003 | Joshi | 716/108 |
| 6,732,066 B2* | 5/2004 | Krishnamoorthy | 703/14 |
| 6,990,646 B2* | 1/2006 | Yoshikawa | 716/114 |
| 2001/0007144 A1* | 7/2001 | Terazawa | 716/6 |

FOREIGN PATENT DOCUMENTS

| | | |
|---|---|---|
| JP | 2004-38383 | 2/2004 |
| JP | 2005-215934 A | 8/2005 |

OTHER PUBLICATIONS

Japanese Office Action dated Apr. 11, 2012, with partial English-language translation.

* cited by examiner

*Primary Examiner* — Sun Lin

(74) *Attorney, Agent, or Firm* — McGinn IP Law Group, PLLC

(57) ABSTRACT

A method that achieves convergence of a hold time error in a relatively easy way without causing a setup time error even when the hold time error occurs in a large circuit, a device and a computer-readable storage medium storing a program therefor are provided. Group a first error path and a second error path in error paths which a hold time error occurs if there is a sharing path that shares its start point with the first error path and also shares its end point with the second error path, and insert a delay element without causing a setup time error per the grouped error paths. Convergence of a hold time error can be achieved without taking into account of a node that is not included in the group and there is no worry about causing a setup time error in a path that is not included in the group.

18 Claims, 19 Drawing Sheets

FIG. 3

| Point | Path | Setup_Margin |
|---|---|---|
| FF1/CLK | | 0.80 |
| FF1/Q | | 0.25 |
| A1/B | | 0.40 |
| A1/Y | | 0.10 |
| A2/B | | 0.10 |
| A2/Y | | 0.05 |
| A3/A | | 0.30 |
| A3/Y | | 0.20 |
| FF2/DATA | | 0.20 |
| Slack (VIOLATED) | -0.232 | |

FIG. 7A

SETUP MARGIN VALUE FOR ERROR PATH 1

| Point | Path | Setup Margin |
|---|---|---|
| FF1/CLK | | 0.80 |
| FF1/Q | | 0.10 |
| A3/B | | 0.30 |
| A3/Y | | 0.10 |
| A2/A | | 0.10 |
| A2/Y | | 0.20 |
| FF4/D | | 0.20 |
| slack (VIOLATED) | -0.300 | |

FIG. 7B

SETUP MARGIN VALUE FOR ERROR PATH 3

| Point | Path | Setup Margin |
|---|---|---|
| FF3/CLK | | 0.80 |
| FF3/Q | | 0.10 |
| A1/B | | 0.20 |
| A1/Y | | 0.10 |
| FF5/DATA | | 0.10 |
| Slack (VIOLATED) | -0.200 | |

FIG. 12A
ERROR PATH LIST

| PATH NAME | NODE 1 | NODE 2 | NODE 3 | NODE 4 | NODE 5 | NODE 6 | VIOLATION VALUE |
|---|---|---|---|---|---|---|---|
| EP1 | FF1/Q | A3/B | A3/Y | A2/A | A2/Y | FF4/D | −0.300 |
| EP3 | FF3/Q | A1/B | A1/Y | FF5/D | | | −0.200 |

FIG. 12B
GROUP INFORMATION

| ERROR PATH NAME | ANOTHER ERROR PATH HAVING SHARING PATH | |
|---|---|---|
| EP1 | EP3 | |
| EP3 | EP1 | EP5 |

FIG. 12C
MUTUALLY INFLUENCING NODES

| ERROR PATH NAME | NODE 1 | NODE 2 | ERROR PATH NAME | NODE 1 | NODE 2 | NODE 3 |
|---|---|---|---|---|---|---|
| EP1 | A2/Y | FF4/D | EP3 | FF3/Q | A1/B | A1/Y |

FIG. 18

| CONDITION<br>DELAY<br>LIBRARY | CONDITION 1<br>LIBRARY 1 | CONDITION 2<br>LIBRARY 2 | CONDITION 3<br>LIBRARY 3 |
|---|---|---|---|
| PATH 1 | × | ○ | ○ |
| PATH 2 | ○ | ○ | ○ |
| PATH 3 | ○ | × | × |
| PATH 4 | ○ | ○ | ○ |
| PATH 5 | ○ | ○ | × |
| PATH 6 | ○ | ○ | ○ |
| PATH 7 | ○ | ○ | ○ |

DIAGRAMS ILLUSTRATING PRINCIPLE OF
METHOD DESCRIBED IN PATENT DOCUMENT 1

(A)

(B)

| BETWEEN FLIP FLOPS | Th | Ts | PATH |
|---|---|---|---|
| FF1-FF2 | 5ns | 15ns | FF1.Q(3-1)-AND.A1(3-1)-AND.X(3-1)-FF2.D(4-1) |
| FF1-FF4 | - | 3ns | FF1.Q(3-1)-AND.A1(3-1)-AND.X(3-1)-FF4.D(3-0) |
| FF3-FF2 | - | 4ns | FF3.Q(4-0)-AND.A2(4-0)-AND.X(3-1)-FF2.D(4-1) |

(C)

| INPUT/OUTPUT TERMINAL | Tsm | Ep | FFPATH |
|---|---|---|---|
| AND.A1 | 3 | 1 | FF1-FF2,FF1-FF4 |
| AND.A2 | 4 | - | FF3-FF2 |
| AND.X | 3 | 1 | FF1-FF2,FF1-FF4,FF3-FF2 |
| FF1.Q | 3 | 1 | FF1-FF2,FF1-FF4 |
| FF3.Q | 4 | - | FF3-FF2 |
| FF2.D | 4 | 1 | FF1-FF2,FF3-FF2 |
| FF4.D | 3 | - | FF1-FF4 |

(D)

METHOD OF ACHIEVING CONVERGENCE OF HOLD TIME ERROR, DEVICE AND PROGRAM THEREFOR

REFERENCE TO RELATED APPLICATION

This application is based upon and claims the benefit of the priority of Japanese patent application No. 2008-242957, filed on Sep. 22, 2008, the disclosure of which is incorporated herein in its entirety by reference thereto.

TECHNICAL FIELD

The present invention relates to a method of achieving convergence of a hold time error, a device and a program therefor. The present invention is related especially to a method of achieving convergence of a hold time error without causing a setup time error when a hold time error occurs in a logic circuit that operates in synchronization with a clock signal, and also to a device and a program therefor.

BACKGROUND

Patent Document 1 describes a conventional method of achieving convergence of a hold time error. FIG. 19 is a diagram illustrating a principle of a method of achieving convergence of a hold time error described in Patent Document 1. FIG. 19 is essentially identical to FIG. 1 of Patent Document 1.

The method is applicable to a typical logic circuit that operates in synchronization with a clock signal and comprises a sequential circuit that operates in synchronization with a clock signal and a combinational circuit, wherein the combinational circuit (LOGIC, AND) is arranged between an output terminal (FF1Q, FF3Q) of a sequential circuit at a previous stage and an input terminal (FF2D, FF4D) of a sequential circuit at a next stage.

According to Patent Document 1, through step S101 in (A) of FIG. 19, obtain a hold time violation value for each path and obtain setup margin values for all paths irrespective whether a hold time error occurs or not (See (C) of FIG. 19, where Th denotes a hold time violation value and Ts denotes a setup margin value).

If a measure for the violation can be taken (step S106), a minimum setup margin value at an input/output terminal of almost all circuits is obtained. Each path which passes through an input/output terminal has its setup margin value. A minimum setup margin value for the input/output terminal means the minimum value of the setup margin values (see S102, (D) of FIG. 19, where Tsm denotes a minimum setup margin value, Ep denotes a count of hold time violation, FFPATH denotes a path which passes thorough the terminal).

Determine where a delay element is inserted based on data shown in the above (C) and (D) of FIG. 19 (S103) in order to achieve convergence of a hold time error, and insert a delay element (S104). Since data shown in (C) and (D) of FIG. 19 varies owing to insertion of a delay element, the data is updated (S105). According to Patent Document 1, continue the series of operations as long as a measure for the violation can be taken.

[Patent Document 1]
JP Patent Kokai Publication No. JP-P2004-38383A

SUMMARY

The entire disclosure of Patent Document 1 is incorporated herein by reference thereto. The following analysis is given by the present invention. It is conceivable that convergence of a hold time error can be achieved without causing a setup time error up to some circuit scale according to Patent Document 1.

However, if the circuit scale becomes large, it becomes difficult to achieve convergence of a hold time error within a reasonable time according to a method described in Patent Document 1.

Whenever a delay element is inserted, a hold time violation value and setup margin value for each path including a path in which a hold time error does not occur have to be obtained. If the circuit scale exceeds some scale, it becomes difficult to achieve convergence of a hold time error within a reasonable time even when the process is executed on a latest EWS (Engineering Workstation).

According to an aspect of the present invention, there is provided a method of achieving convergence of a hold time error. The method includes listing an error path in which a hold time error occurs, grouping a first error path and a second error path in the error paths if there is a sharing path that shares its start point with the first error path and also shares its end point with the second error path; and achieving convergence of the hold time error by inserting a delay element without causing a setup time error per grouped error path.

According to another aspect of the present invention, there is provided a device for achieving convergence of a hold time error. The device includes a hold time error memory unit that stores an error path in which a hold time error occurs and their hold time violation value; a setup margin value memory unit that stores a setup margin value at each node along the error path; and a group information memory unit that stores, as a group information, a first error path and a second error path in the error paths if there is a sharing path that shares its start point with the first error path and also shares its end point with the second error path. The device further includes an intra-group mutually influencing node memory unit that stores, as an intra-group mutually influencing node, a node shared between the sharing path and the first error path and a node shared between the sharing path and the second error path; a delay element insertion unit that inserts a delay element so as to achieve convergence of a hold time error within the setup margin value at each node; and a setup margin value update unit that updates along with insertion of the delay element a setup margin value at each node along an error path to which a delay element is inserted in the same way based on a delay value of the delay element and updates a setup margin value at each node within the intra-group mutually influencing nodes except nodes along the error path in the same way based on the delay value of the delay element if the delay element is inserted to the intra-group mutually influencing nodes.

A computer-readable storage medium according to yet another aspect of the present invention includes a computer-readable storage medium storing a program for causing a computer to execute the above method of achieving convergence of a hold time error.

A computer-readable storage medium according to another aspect of the present invention includes a computer-readable storage medium storing a program for causing a computer to function as the above device for achieving convergence of a hold time error.

The meritorious effects of the present invention are summarized as follows. According to the present invention, convergence of a hold time error can be achieved in a relatively easy way even when the size of a circuit is large. Since a first error path and a second error path within error paths wherein a hold time error occurs are grouped if there is a sharing path that shares its start point with the first error path and also shares its end point with the second error path and convergence of the hold time error is achieved per grouped error path, convergence of the hold time error can be achieved without taking into account of a path and node that is not included in the group.

BRIEF DESCRIPTIONS OF THE DRAWINGS

FIG. 3 is a diagram showing setup margin values according to an example of the present invention.

FIGS. 7A and 7B are diagrams illustrating other setup margin values according to an example of the present invention.

FIGS. 12A to 12C are diagrams illustrating an example of an error path list, group information and mutually influencing node according to an example of the present invention.

FIG. 18 is a diagram illustrating a timing analysis result according to another example of the present invention.

PREFERRED MODES

Figure 1:
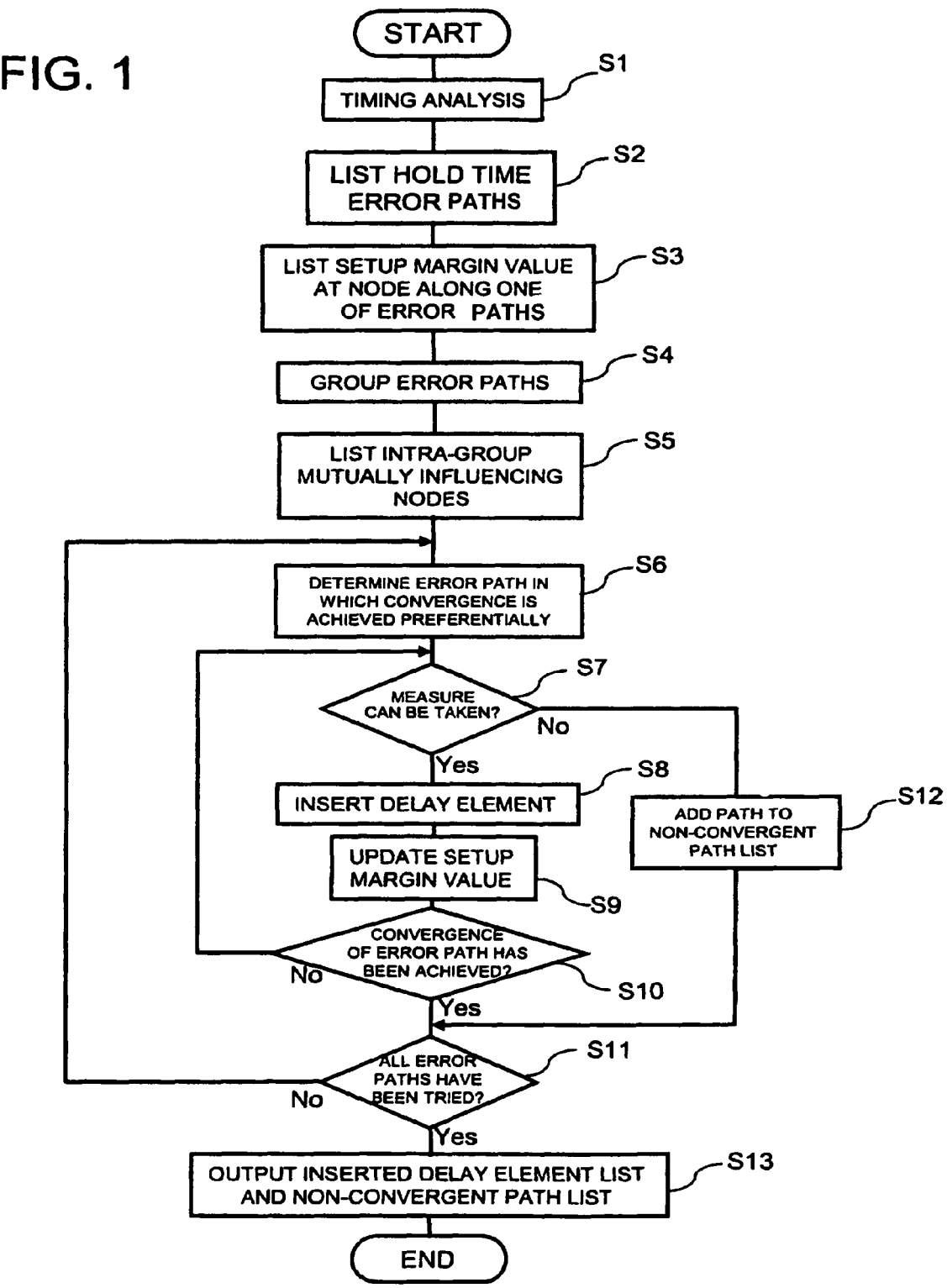
FIG. 1 is a flowchart illustrating a method of achieving convergence of a hold time error according to an example of the present invention.

Preferred modes of the present invention will now be described with reference to the drawings as necessary. Note that drawings and reference numerals in the drawings illustrate preferred modes as an example and they do not limit variations of preferred modes according to the present invention.

Figure 8:
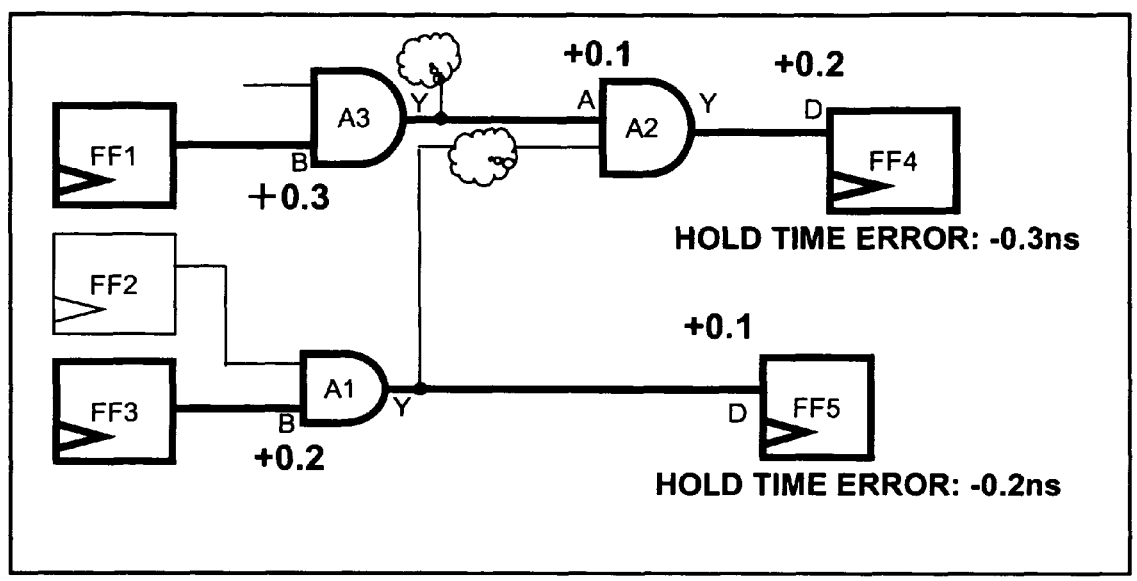
FIG. 8 is a circuit diagram illustrating a second exemplary circuit to be examined by an example of the present invention.
Figure 16:
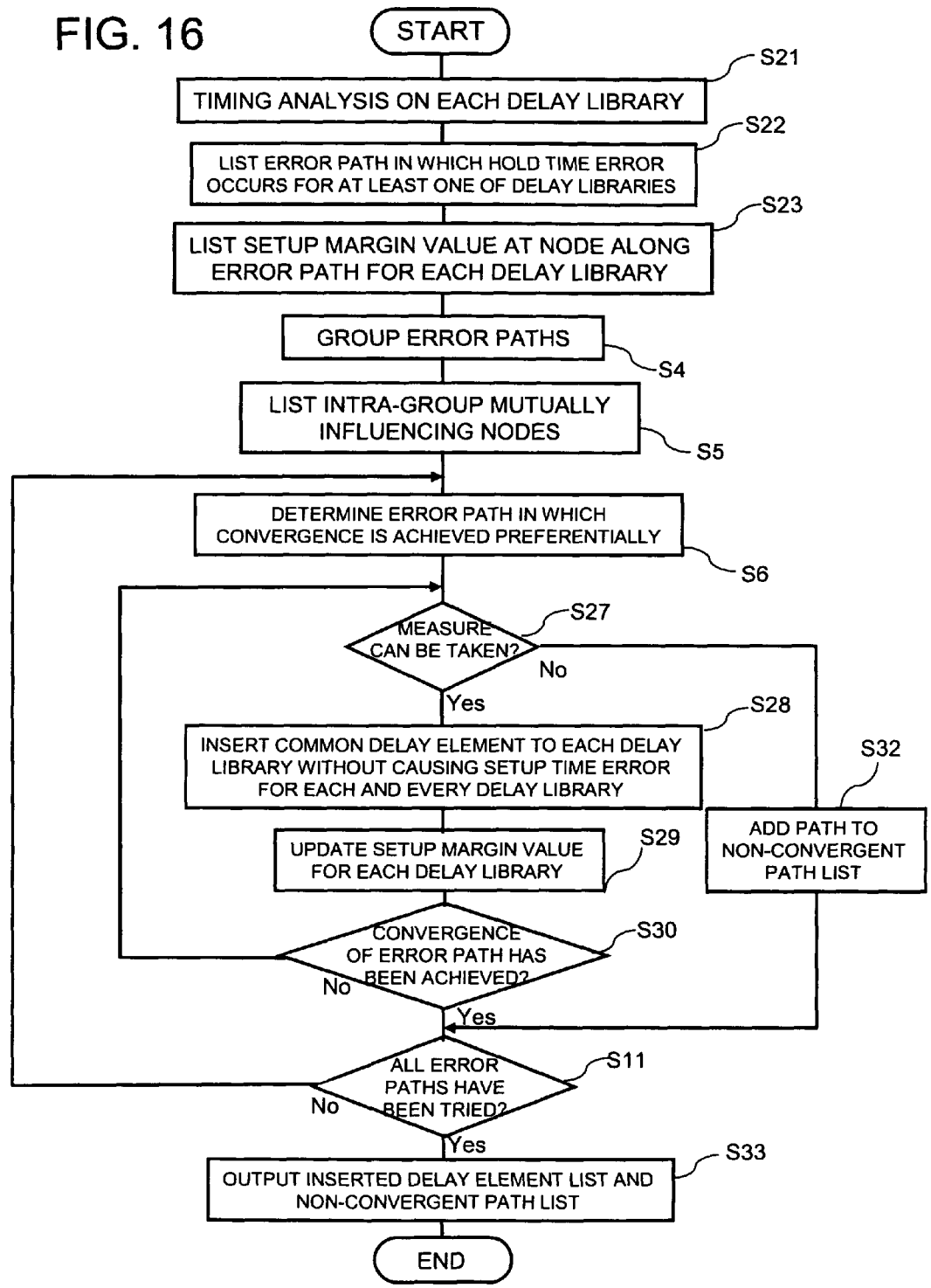
FIG. 16 is a flowchart illustrating a method of achieving convergence of a hold time error according to another example of the present invention.

As shown in FIG. 1 and FIG. 16, a method of achieving convergence of a hold time error according to an exemplary mode of the present invention includes:

a step (S2) of listing an error path in which a hold time error occurs from a target circuit (for example, a circuit of FIG. 8);

a step (S4) of grouping a first error path (for example, FF3→A1→FF5) and a second error path (for example, FF1→A3→A2→FF4) in the error paths if there is a sharing path (FF3→A1→A2→FF4) that shares its start point (FF3) with the first error path and also shares its end point with the second error path; and a step (S10, S30; Yes) of achieving convergence of the hold time error by inserting a delay element (Delay Element in FIG. 6 or FIG. 11) without causing a setup time error per grouped error path.

According to a viewpoint of the present inventor, a delay element is inserted only to a path in which a hold time error occurs in order to achieve convergence of the hold time error and a delay element is not inserted to places other than the path. As long as a delay element within a setup margin value at each node along an error path is inserted, insertion of the delay element to the error path does not cause a setup time error other than along the error path. However, if there is a path that shares its start point with one of error paths and also shares its end point with the other of the error paths, insertion of a delay element may cause both setup margin values to influence each other through the sharing path. According to the above recognition, if convergence of a hold time error is achieved by grouping error paths having a sharing path, in which a hold time error occurs, convergence of a hold time error can be achieved without taking into account of a path and node that is not included in the error paths which does not cause a setup time error. As long as there is an error path that shares its start point and its end point with a first error path and a second error path, the first error path and the second error path are grouped even when the sharing path itself is not an error path.

The term "error path" means "path where a hold time error occurs" in the present invention. For the sake of simplicity, "path where a hold time error occurs" is simply called "error path" in this specification.

Figure 9:
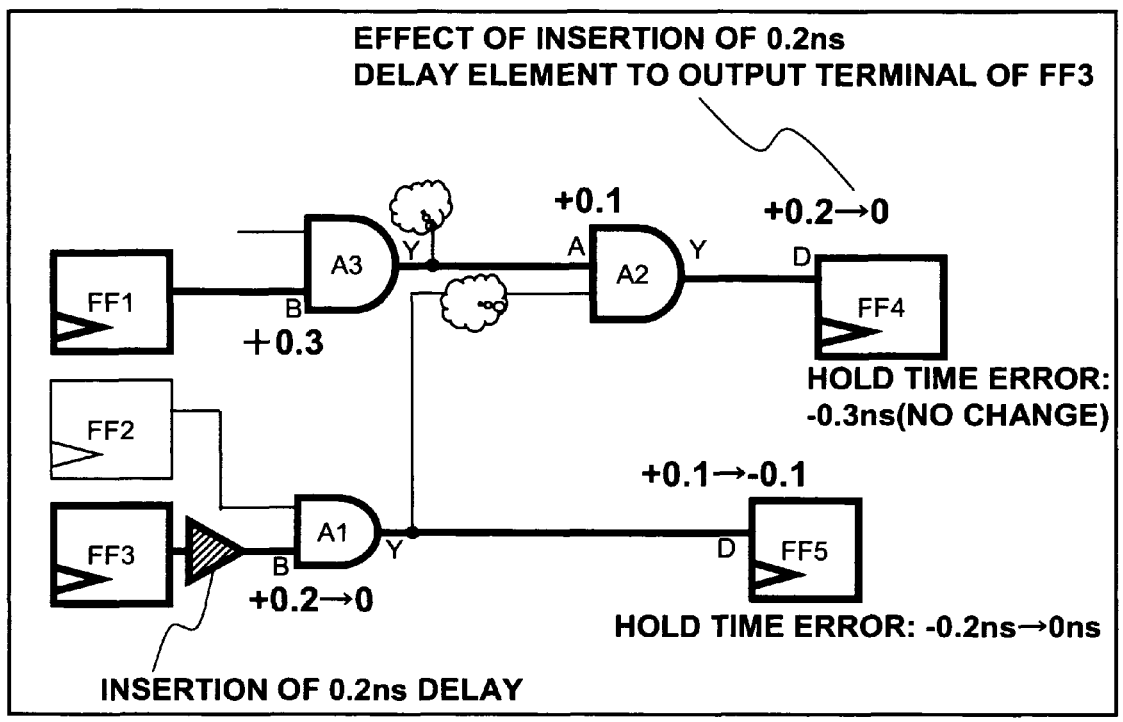
FIG. 9 is a circuit diagram illustrating a second exemplary circuit after a delay element has been inserted according to an example of the present invention.

As shown in FIG. 1 and FIG. 16, a method of achieving convergence of a hold time error according to an exemplary mode of the present invention may further include:

a step of obtaining a setup margin value at each node (input/output terminal of a sequential circuit or combinational circuit) along the error paths; and a step (S5) of obtaining, for the grouped error paths (for example "FF3→A1→FF5" and "FF1→A3→A2→FF4" in FIG. 8), a node (FF3/Q, A1/B, A1/Y) shared between the sharing path ("FF3→A1→FF5") and the first error path ("FF3→A1→FF5") and a node (A2/Y, FF2/DATA) shared between the sharing path ("FF3→A1→A2→FF4") and the second error path ("FF1→A3→A2→FF4") as an intra-group mutually influencing node (FF3/Q, A1/B, A1/Y, A2/Y, FF4/DATA);

wherein the step of achieving convergence of the hold time error may by a step of updating a setup margin value at each node along an error path that includes the delay element (for example, a delay element arranged at an output terminal Q of FF3 in FIG. 9) in the same way based on a delay value of the inserted delay element, updating a setup margin value at the intra-group mutually influencing node in the same way based on the delay value of the inserted delay element if the delay element is inserted to the intra-group mutually influencing node, and repeating insertion of the delay element and update of the setup margin value until the hold time error converges.

According to the present invention, it is sufficient to obtain a setup margin value only at a node along an error path. It is not necessary to obtain a setup margin value at a node that is not along an error path. The reason is that a delay element is inserted only to a node along an error path. As long as a delay element is inserted within a setup margin value at each node, insertion of the delay element does not cause a setup time error even when a setup margin value at another node is not considered.

When a delay element is inserted, it is necessary, in principle, to update a setup margin value only at each node along an error path to which the delay element is inserted. When a node to which a delay element is inserted is an intra-group mutually influencing node, it is necessary to update a setup margin value at a mutually influencing node along another error path within the group.

There is a case where a setup margin value at another node is influenced by insertion of a delay element. However, since another node which is influenced is not a node along an error path, a delay element is not inserted to the node as described above and it is not necessary to obtain a setup margin value.

When a setup margin value is updated, the process is simplified by updating in the same way based on a delay value of an inserted delay element. When a node along an error path is passed by a plurality of paths and an error path to which a delay element is inserted is not a path that determines a minimum setup margin value, there is a case where update in the same way based on a delay value of the inserted delay element results in an excessive margin. However, according to the preferred mode, update in the same way based on a value simplifies calculation. Although update in the same way may result in an excessive margin, a setup margin value is more severely estimated. Therefore, there is no fear that a setup time error is caused.

As shown in FIG. 1, there is provided a method of achieving convergence of a hold time error according to an exemplary mode of the present invention, wherein the step of achieving convergence of the hold time error may include:

a step (S6) of determining an error path in which convergence is achieved preferentially among error paths in which a hold time error occurs;

a step of achieving convergence of a hold time error in the error path in which convergence is achieved preferentially;

a step of achieving convergence of a hold time error in another error path included in the same group as the error path in which convergence is achieved preferentially; and a step of achieving convergence of a hold time error in an error path that is not included in the group.

According to the above preferred mode, when an error path in which convergence is achieved preferentially is determined, the error path is made to converge preferentially until convergence of a hold time error for the error path is achieved. It is possible to achieve convergence of any error that can be made to converge by following the above procedure.

According to Patent Document 1, whenever a delay element is inserted, obtain a path with a maximum hold time violation value and achieve convergence of a hold time error for the path a maximum hold time violation value (see paragraphs 0052, 0060 etc. in Patent Document 1). According to this procedure, every time a delay element is inserted, a different path may be chosen as a path with a maximum hold time violation value. When all hold time errors can be resolved in the end, this may cause no problem. However, if there remains a hold time error that can not be resolved in the end, insertion of a delay element may result in many error paths, in which convergence is not reached.

When convergence of all hold time errors can not be achieved and an error path is left, it is necessary to reduce the unresolved hold time errors in order to make it easy to take a measure of circuit replacement and so on. In this respect, once an error path, in which convergence is achieved preferentially, is determined as in the preferred mode, it is desirable that the error path is made to converge preferentially until convergence of a hold time error for the error path is achieved.

As shown in FIG. 16, there is provided a method of achieving convergence of a hold time error according to an exemplary mode of the present invention, wherein the above method of achieving convergence of a hold time error may be a method of achieving convergence of a hold time error without causing a setup time error for each and every delay library when timing analysis performed using a plurality of delay libraries (26 in FIG. 17) causes a hold time error for at least one of the plurality of delay libraries;

the step of listing an error path in which a hold time error occurs may be a step (S22) of listing an error path in which a hold time error occurs for at least one of the plurality of delay libraries;

the step of obtaining a setup margin value may be a step (S23) of obtaining a setup margin value for each of the plurality of the delay libraries; and the step of achieving convergence of a hold time error may be a step (S28) of inserting, per the grouped error paths, a common delay element to each delay library without causing a setup time error for each and every delay library and achieving convergence of the hold time error and the step may be a step of, for each delay library, updating a setup margin value at each node along an error path that includes the delay element in the same way based on delay value of the inserted delay element, updating a setup margin value at the intra-group mutually influencing node in the same way based on the delay value of the inserted delay element if the delay element is inserted to the intra-group mutually influencing node, and repeating insertion of the delay element and update of the setup margin value until the hold time error converges for each delay library.

According to the above method, when timing analysis is performed using a plurality of delay libraries and a hold time error occurs for at least one of the plurality of delay libraries, convergence of the hold time error can be achieved without causing a setup time error irrespective of which delay libraries is used.

Figure 2:
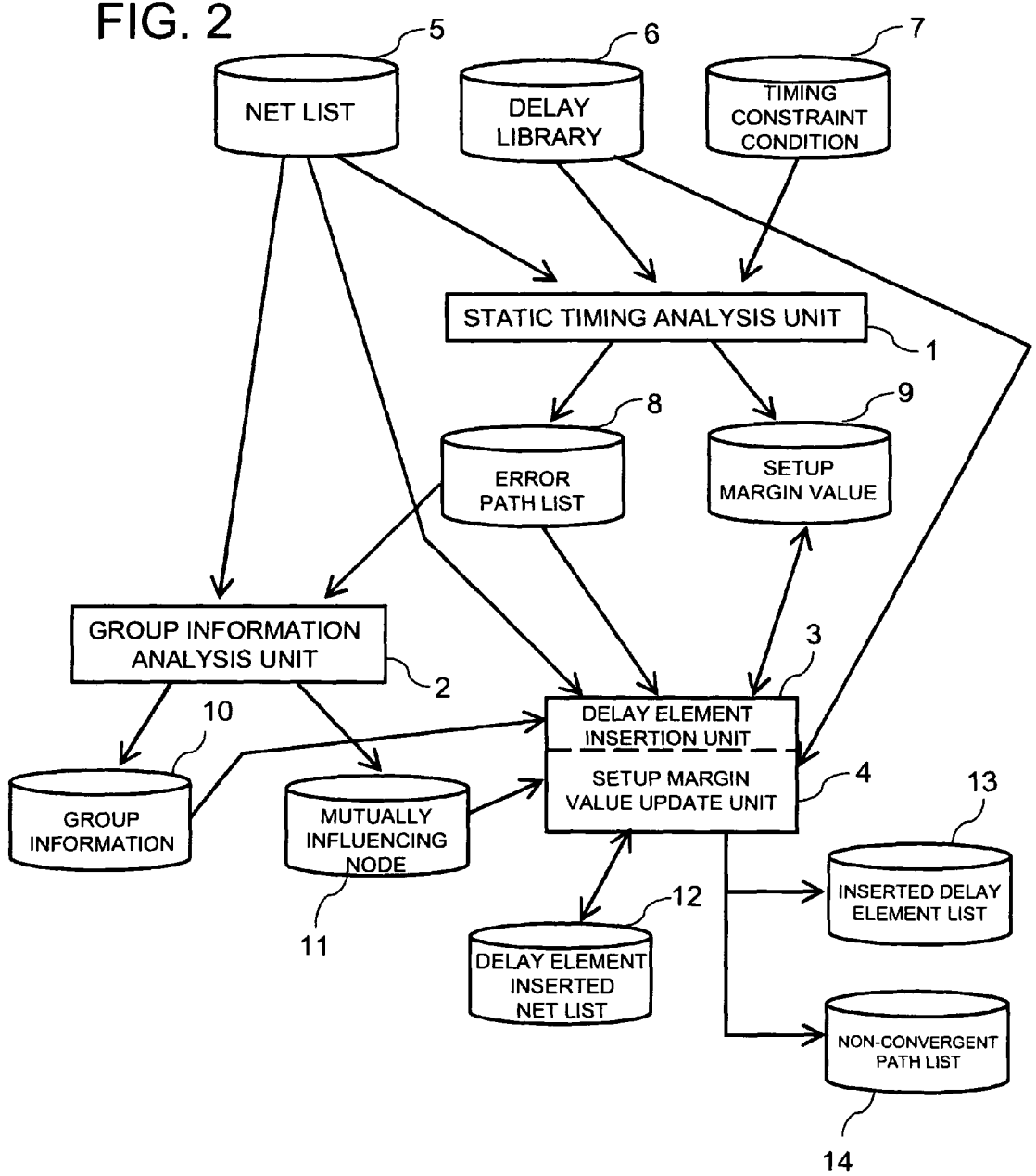
FIG. 2 is a block diagram showing a structure of a device for achieving convergence of a hold time error according to an example of the present invention.
Figure 17:
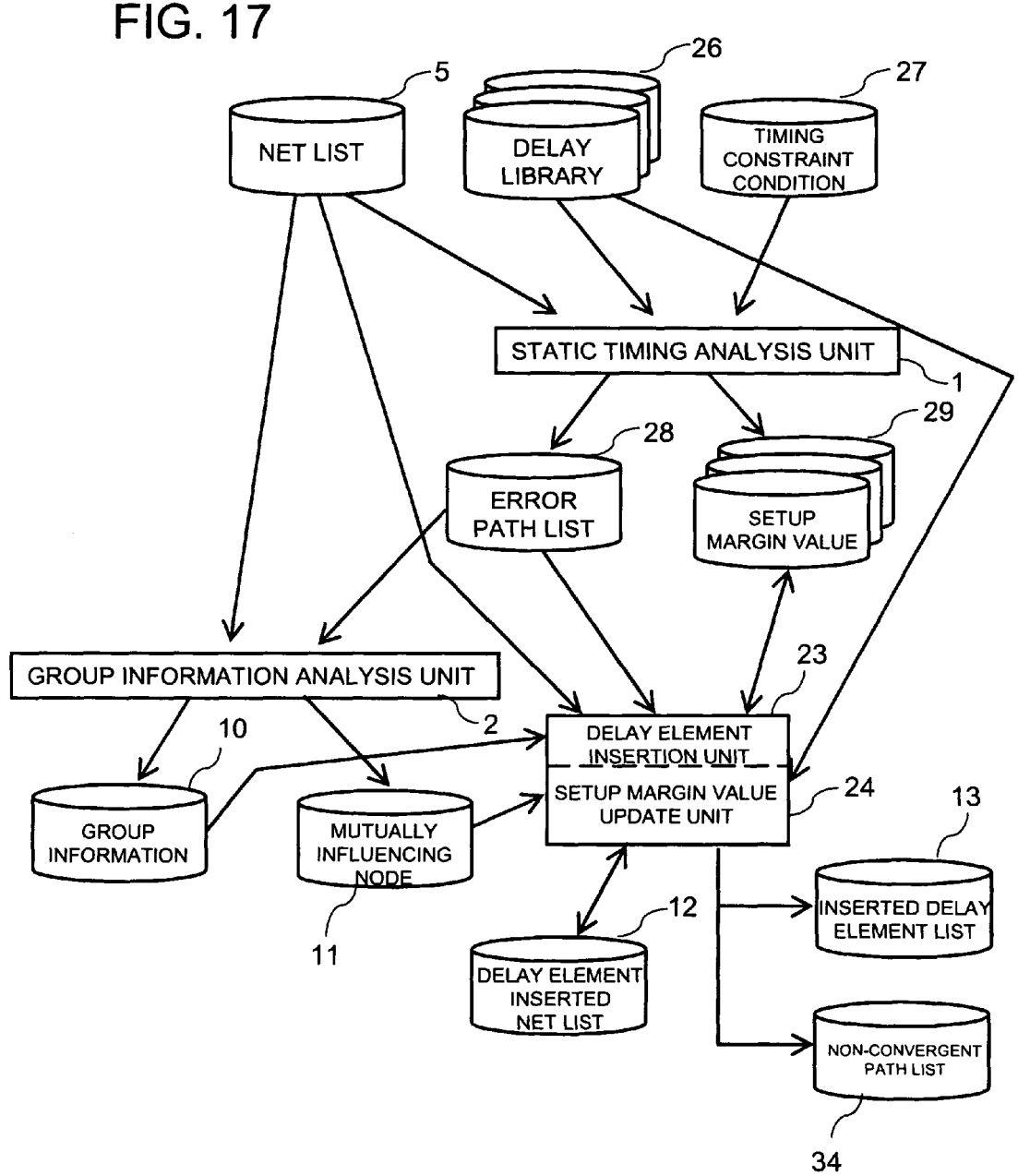
FIG. 17 is a block diagram illustrating a structure of a device for achieving convergence of a hold time error according to another example of the present invention.
Figure 19:
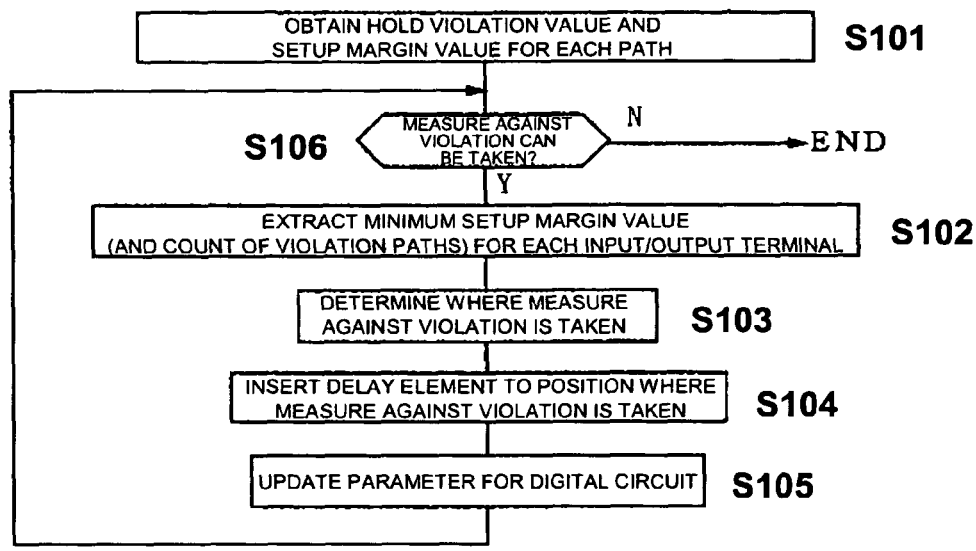
FIG. 19 is a diagram illustrating a principle of a conventional method of achieving convergence of a hold time error described in Patent Document 1.
Figure 19:
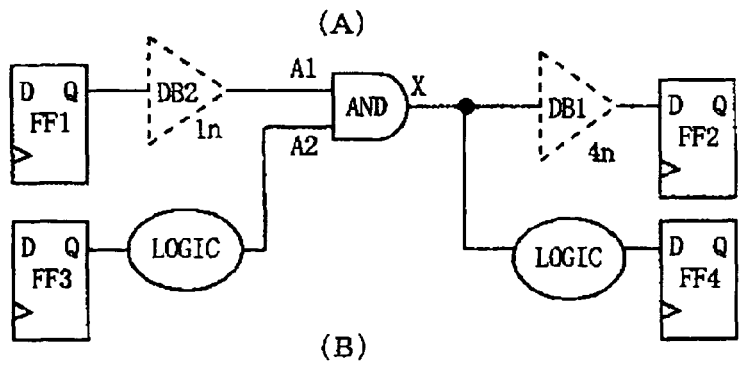

As shown in FIG. 2 and FIG. 17, a device for achieving convergence of a hold time error according to an exemplary mode of the present invention may include:

a hold time error memory unit (8, 28, FIG. 12A) that stores an error path ("FF1→A1→A2→A3→FF2" in FIG. 4 or "FF3→A1→FF5" and "FF1→A3→A2→FF4" in FIG. 8) wherein a hold time error occurs and their hold time violation value;

a setup margin value memory unit (9, 29, FIG. 3, FIGS. 7A and 7B) that stores a setup margin value at each node along the error path;

a group information memory unit (10, FIG. 12B) that stores, as a group information, a first error path and a second error path in the error paths if there is a sharing path that shares its start point with the first error path and also shares its end point with the second error path;

an intra-group mutually influencing node memory unit (11, FIG. 12C) that stores, as an intra-group mutually influencing node, a node shared between the sharing path and the first error path and a node shared between the sharing path and the second error path;

a delay element insertion unit (3, 23) that inserts a delay element so as to achieve convergence of a hold time error within the setup margin value at each node; and a setup margin value update unit (4, 24) that updates along with insertion of the delay element a setup margin value at each node along an error path to which a delay element is inserted in the same way based on a delay value of the delay element and updates a setup margin value at each node within the intra-group mutually influencing nodes except nodes along the error path in the same way based on the delay value of the delay element if the delay element is inserted to the intra-group mutually influencing nodes.

As shown in FIG. 2 and FIG. 17, a device for achieving convergence of a hold time error according to an exemplary mode of the present invention may further include:

a net list memory unit 5 that stores a net list of a circuit in which convergence is targeted; and a group information analysis unit 2 that inputs the net list from the net list memory unit and the error path from the hold time error memory (8, 28), obtains the group information and the intra-group mutually influencing nodes, and outputs the group information to the group information memory unit 10 and the intra-group mutually influencing nodes to the intra-group mutually influencing nodes memory unit 11.

In the following, examples will be described with reference to the drawings.

FIRST EXAMPLE

FIG. 2 is a block diagram showing a structure of a device for achieving hold time error convergence according to a first example. In the block diagram shown in FIG. 2, static timing analysis unit 1 inputs net list 5 for a circuit to be analyzed and a delay library that represents a delay value of each circuit in net list 5, and timing constraint condition 7 to determine whether each path in net list 5 causes a setup time error or a hold time error and, if there is a path in which a hold time error occurs, outputs the path in which a hold time error occurs as an error path to error path list 8 and also outputs a minimum setup margin value at each node along the error path as setup margin value 9.

Group information analysis unit 2 inputs net list 5 and error path list 8, determines whether error paths in the error path list contain a sharing path that will explained in detail later on, and, if there is a sharing path, outputs an information on grouping error paths each other, which have a sharing path, as group information 10. Group information analysis unit 2 outputs a mutually influencing node along the error path, which has the above sharing path, as mutually influencing node 11.

Delay element insertion unit 3, as a basic processing, inputs error path list 8 and setup margin value 9, inserts a delay element within setup margin value 9 at each node along an error path and aims at achieving convergence of a hold time error by inserting a delay element without causing a setup time error. Delay element insertion unit 3 refers to group information 10 and mutually influencing node 11 and, if an error path, in which convergence of a hold time error is achieved, is grouped with another error path, insert a delay element without causing a setup time error in another grouped error path by taking into account of a setup margin value at a mutually influencing node along another grouped error path.

If delay element insertion unit 3 inserts a delay element, setup margin value update unit 4, along with insertion of the delay element, updates each node along the error path in the same way based on a delay value of the delay element and, if the error path is grouped, updates intra-group mutually influencing nodes except ones along the error path in the same way based on the delay value of the delay element. Setup margin value update unit 4 generates delay element inserted net list 12 that includes an inserted delay element, updates net list 5, outputs a delay element that is inserted by delay element insertion unit 3 as inserted delay element list 13, and, if there is an error path in which convergence of a hold time error cannot be achieved, outputs the error path as non-convergent path list 14.

Figure 4:
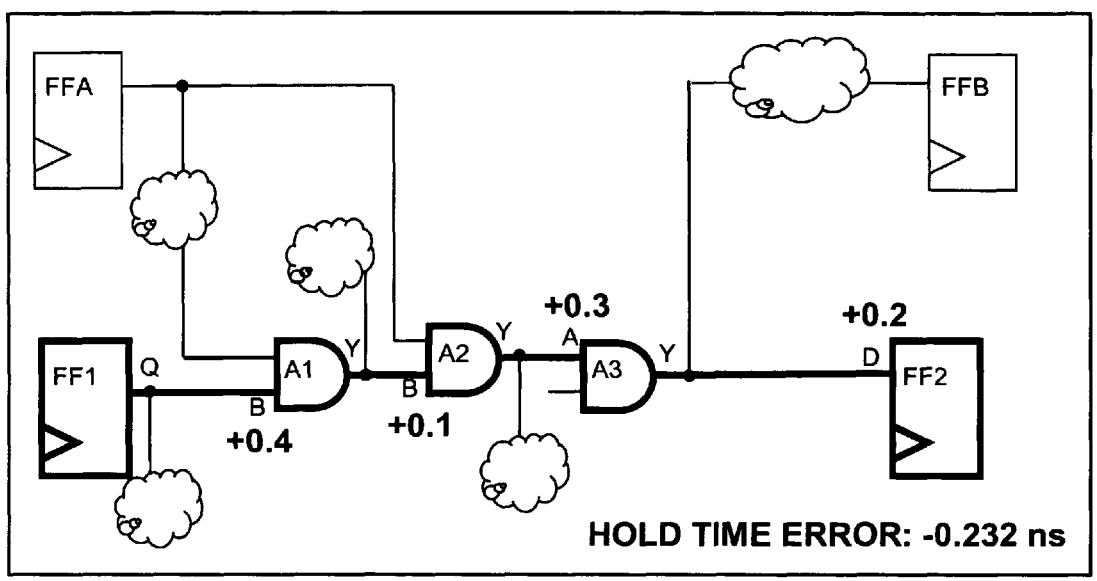
FIG. 4 is a circuit diagram illustrating a first exemplary circuit to be examined by an example of the present invention.

With reference to a flowchart of FIG. 1, processing steps of a method of achieving convergence of a hold time error is illustrated. A first exemplary circuit of FIG. 4 is employed in order to illustrate a method of achieving convergence according to a first example. It is assumed that a 0.232-ns hold time error occurs in a path "FF1→A1→A2→A3→FF2" shown as a heavy line in a circuit of FIG. 4. It is also assumed that a hold time error does not occur in another path within the circuit.

Firstly, a static timing analysis is performed on the targeted circuit of FIG. 4 in step S1 in FIG. 1. According to this timing analysis, it is found that a 0.232-ns hold time error occurs in the path "FF1→A1→A2→A3→FF2". List the path, where a hold time error occurs, and output it as error path list 8 in step S2.

List a setup margin value at each node along an error path in step S3. FIG. 3 shows a setup margin value at each node along the error path in the circuit of FIG. 4. In FIG. 3, a column "Point" shows the name of each node and a column "Setup Margin" shows the setup margin value at each node. A column "Path" shows also the value of a hold time error. Each node along an error path is passed by a plurality of paths, each of which has a different setup margin value. However, the smallest value among setup margin values at each node is shown as a setup margin value in FIG. 3. For example, output terminal Y of AND gate A3 in the circuit of FIG. 4 is passed by a path "FF1→FF2" and also passed by a path "FF1→FFB", "FFA→FF2" and "FFA→FFB". Each of these paths has a different setup margin value (a margin value that does not cause a setup time error even when a delay element is inserted). A minimum setup margin value of 0.20 among these setup margin values is selected as a setup margin value at A3/Y. In the present example, information on which path determines a minimum setup margin value is not necessary. In the present example, only a setup margin value at each node along an error path is necessary. A setup margin value at a node that is not along an error path is not necessary.

Since there is only one error path in a circuit of FIG. 4, a step of grouping error paths in step S4 and a step of listing intra-group mutually influencing nodes in step S5 in FIG. 1 can be omitted. A step of determining an error path in which convergence is achieved preferentially in step S6 can also be omitted.

Determine whether it is possible to resolve a hold time error without causing a setup time error by insertion of a delay element in step S7. Since convergence cannot be achieved by insertion of a delay element to an error path if the value of a hold time error exceeds the sum of setup margin values at each node along the error path, the path is registered in non-convergent path list 14 in step S12. Review the circuit and its specification as needed later on for a non-convergent path registered in non-convergent path list 14.

Figure 5:
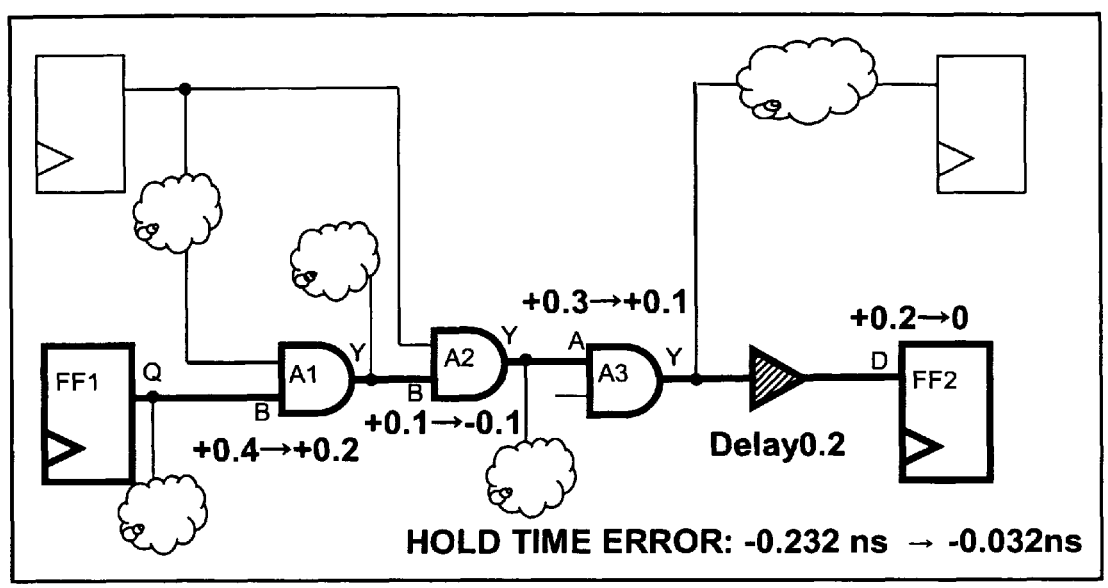
FIG. 5 is a circuit diagram illustrating a first exemplary circuit processed by an example of the present invention.

Insert a delay element to each node within its setup margin value in FIG. 3 in step S8. As described in Patent Document 1, a delay element may be inserted to a node with a largest margin value. In the present example, a 0.2-ns delay element is inserted to a node of a D input terminal of FF2 as shown in FIG. 5.

Since a setup margin value at each node varies owing to insertion of the delay element, the set up margin value is updated in step S9. A setup margin value at all nodes along the error path is subtracted by a delay of 0.2 ns in the same way in step S9. A setup margin value at the D input terminal of FF2 becomes from +0.2 to 0. Although a setup margin value at a B input terminal of AND gate A2 becomes from +0.1 to −0.1, it causes no problem. If a delay element is inserted within a setup margin value of the D input terminal of FF2, to which the delay element has been inserted, a setup time error should not be caused originally. Although a setup margin value at the B input terminal of AND gate A2 should not become a negative value, the setup margin value is negative in its appearance because a setup margin value at all nodes is subtracted in the same way in order to simplify the calculation. If a setup margin value becomes negative, the setup margin value may be set to zero. In any event, if a setup margin value at a node becomes negative or zero, it is sufficient to know that a delay element cannot be inserted to the node with a negative or zero setup margin value.

Figure 6:
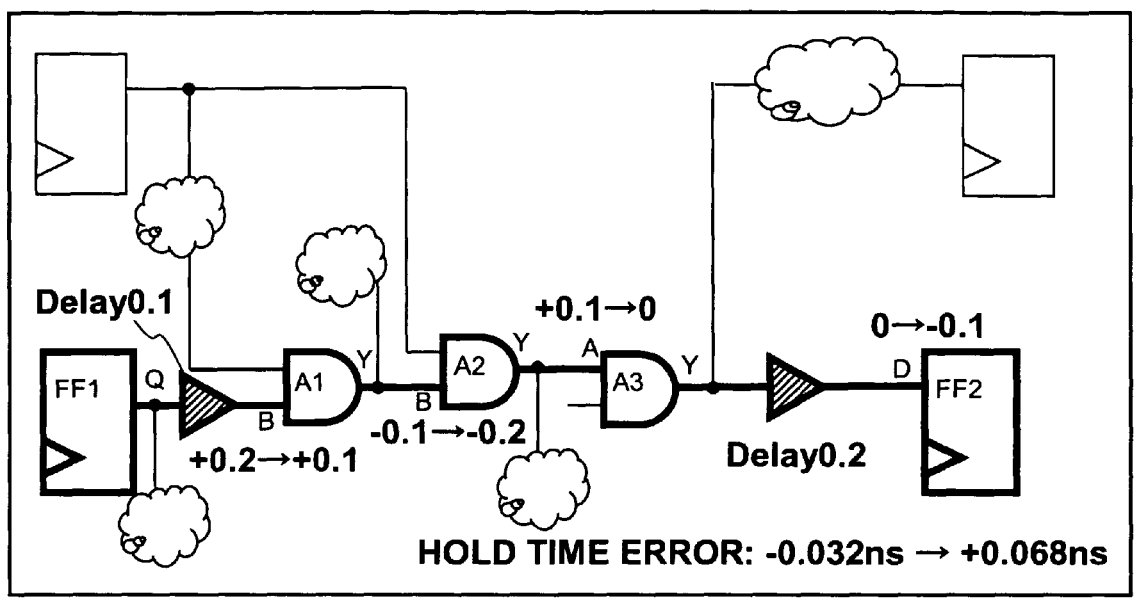
FIG. 6 is a circuit diagram illustrating a first exemplary circuit after convergence of a hold time error has been achieved by an example of the present invention.

Determine whether a hold time error has been resolved in step S10. In FIG. 5, Insertion of a 0.2-ns delay element reduces the value of a hold time error from −0.232 ns to −0.032 ns, but not to zero. Therefore, go back to step S7 and continue the processing. Insert a delay element so as to satisfy an updated setup margin value in step S8 for the second time. The value of a hold time error becomes from −0.032 ns to +0.068 ns by inserting a 0.1-ns delay element to a B input terminal of AND gate A1 as shown in FIG. 6 and it is found that convergence of the hold time error has been achieved. In the processings from step S6 to step S10, when a plurality of a hold time errors occur, try to achieve convergence of the all hold time errors and for all error paths are tried. Finally, a list of delay elements inserted to an original net list and a non-convergent path list are output (step S13) and the processing ends.

According to the above processing, when a delay element is inserted, convergence of a hold time error can be achieved rapidly because a setup margin value for a path other than an error path and a setup margin value at a node other than a node along an error path are not taking into account and their setup margin values are not updated. Since a setup margin value is updated in the same way for each node along an error path, convergence of a hold time error can be achieved rapidly.

As the first example of the present invention, a method of achieving convergence of a hold time error in a second exemplary circuit, which is a little more complex than the above first exemplary circuit, is explained. FIG. 8 is a circuit diagram illustrating the second exemplary circuit. As a result of timing analysis of the circuit of FIG. 8 in step S1, a −0.3-ns hold time error occurs in a path "FF1→FF4" (hereinafter called "error path 1") and a −0.2-ns hold time error occurs in a path FF3→FF5 (hereinafter called "error path 3"). For occurrence of these hold time errors, a path in which a hold time error occurs and a violation value of the hold time error may be output as error path list 8 as shown in FIGS. 12A to 12C. Setup margin values are output for each node along error paths 1 and 3 as shown in FIGS. 7A and 7B. Since information on setup margin values shown in FIGS. 7A and 7B includes a list of a path in which a hold time error occurs and a violation value of the hold time error in FIG. 12A, it is not necessary to output information of FIG. 12A.

Group the error paths in step S4. If there is a path that share its start point with one of error paths and shares its end point with the other of the error paths, the error paths are grouped. In FIG. 8, error path 1 and error path 3 are grouped, because there is a path (FF3→A1→A2→FF4) that shares its start point (FF3) with error path 3 and shares its end point (FF4) with error path 1, although a hold time error does not occur in the path. Information on the grouping is output as group information 10 (in FIG. 2) as shown in FIG. 12B. If error path 3 (EP3) and error path 5 (EP5) (not shown in FIG. 8) have a path that shares its start point and end point with these path and error path 1 and error path 5 does not have a path that shares its start point and end point with these path, error path 5 is grouped with error path 3 and is not grouped with error path 1. FIG. 12B illustrates such case.

In step S5, list nodes (FF3/Q, A1/B, A1/Y) shared between the sharing path (FF3→A1→A2→FF4) and the error path3 and nodes (A2/Y, FF4/DATA) shared between the sharing path and the error path1 as intra-group mutually influencing node 11. FIG. 12C shows the listed mutually influencing nodes. The mutually influencing node is a node with the following property: insertion of a delay element to a mutually influencing node along one error path affects a setup margin value at a mutually influencing node along another grouped error path. Once a mutually influencing node has been extracted, information on a node in the middle of the sharing path is not necessary.

In step S6, a path in which convergence is achieved preferentially is determined. Assumed that it is determined that error path 3 is a path in which convergence is achieved preferentially. Since a value of −0.2 ns of the hold time error in error path 3 does not exceed the sum of setup margin values along error path 3, it is determined that a measure can be taken in next step S7 and the processing proceeds to step S8. In step S8, it is also assumed that a 0.2-ns delay element is inserted to a B input terminal of AND gate A1 as shown in FIG. 9. Then, the hold time error in error path 3 converges. In next step S9, the setup margin values are updated. It is to be noted that, with reference to FIG. 12C, the B input terminal of AND gate A1, to which a delay element has been inserted, is included in the mutually influencing nodes of error path 3. Therefore, when the setup margin values are updated, in addition to a setup margin vale at each node along error path 3, with reference to FIG. 12C, setup margin values at a mutually influencing node along error path 1, which belongs to the same group with error path 3, is also updated by subtracting a delay of an inserted delay element from the set up margin value in the same way.

Figure 10:
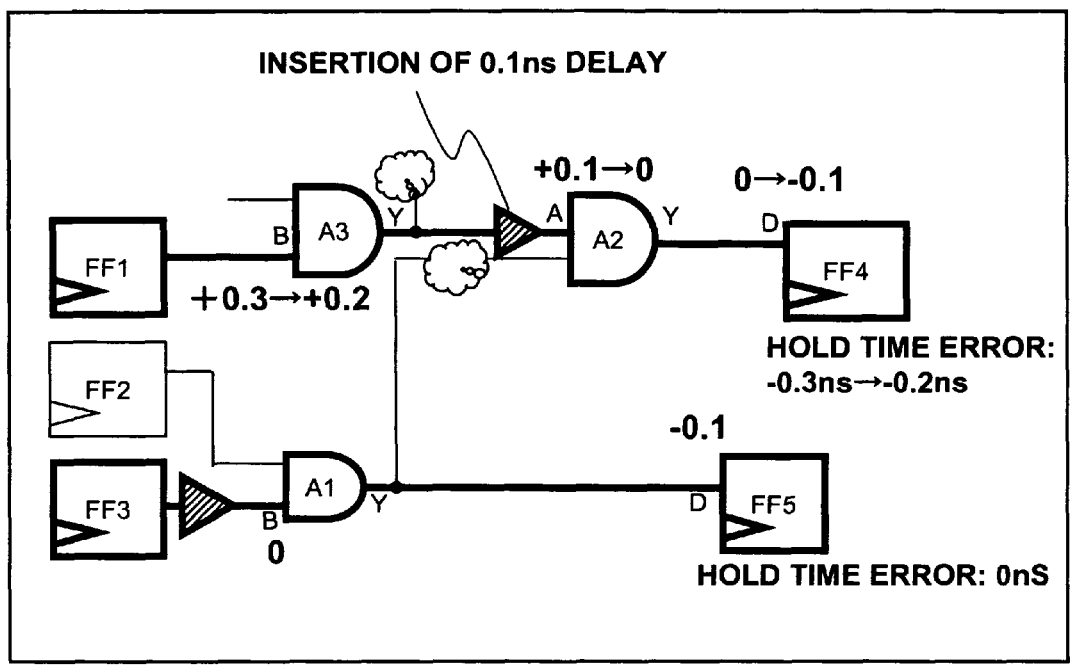
FIG. 10 is a circuit diagram illustrating a second exemplary circuit after two delay circuits have been inserted according to an example of the present invention.
Figure 11:
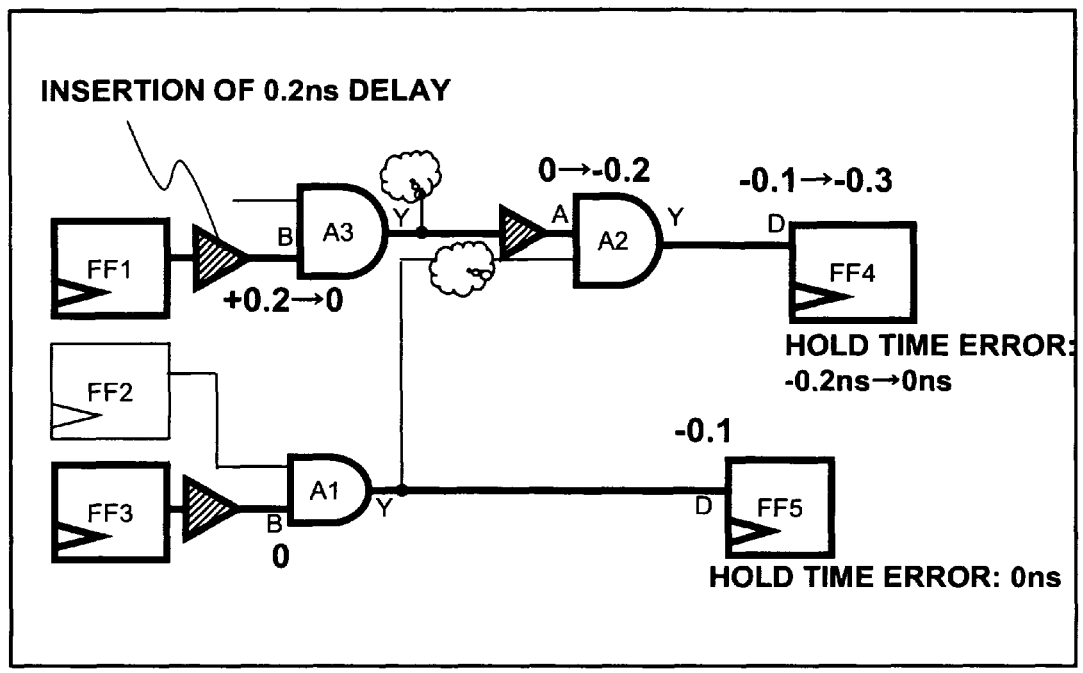
FIG. 11 is a circuit diagram illustrating a second exemplary circuit after convergence of a hold time error has been achieved by an example of the present invention.

Since a setup error for error path 3 has converged while a hold time error for error path 1, which belongs to the same group with error path 3, has not converged, the processing goes back to step S6 and it is determined that error path 1, which belongs to the same group with error path 3, is a path in which convergence is achieved preferentially. As shown in FIG. 10, in step S8, A 0.1-ns delay element is inserted to an A input terminal of AND gate A2. Furthermore, since convergence of a hold time error cannot be achieved by the insertion, a 0.2-ns delay element is inserted to a B input terminal of AND gate A3 as shown in FIG. 11 in step S8 in the next loop and, finally, convergence of a hold time error in error path 1 has been achieved without causing a setup time error.

Since error paths are grouped if there is a path that shares its start point with one of the error paths and also shares its end point with the other of the error paths, it is sufficient to update a setup margin value within the group and a convergence of a hold time error can be achieved rapidly because setup margin value can be updated within a required minimum value.

COMPARATIVE EXAMPLE

For the above second exemplary circuit, an example, where a delay element is inserted without a consideration of grouping and mutually influencing nodes, is explained as a comparative example.

Figure 13:
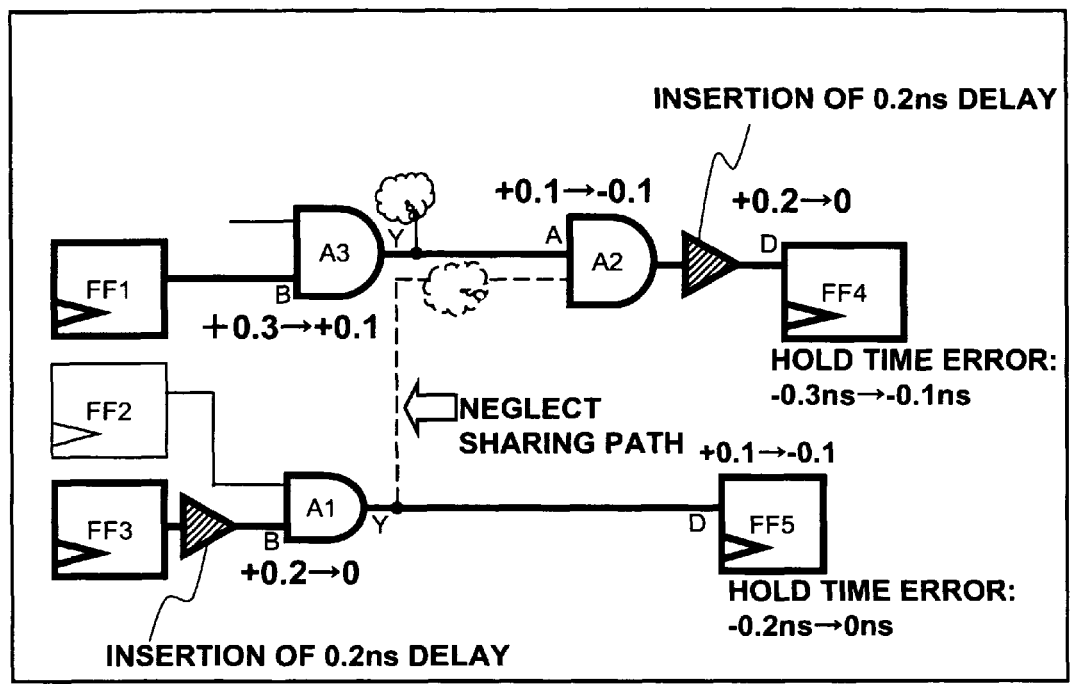
FIG. 13 is a circuit diagram illustrating a second exemplary circuit after two delay circuits have been inserted according to a comparative example of the present invention.
Figure 14:
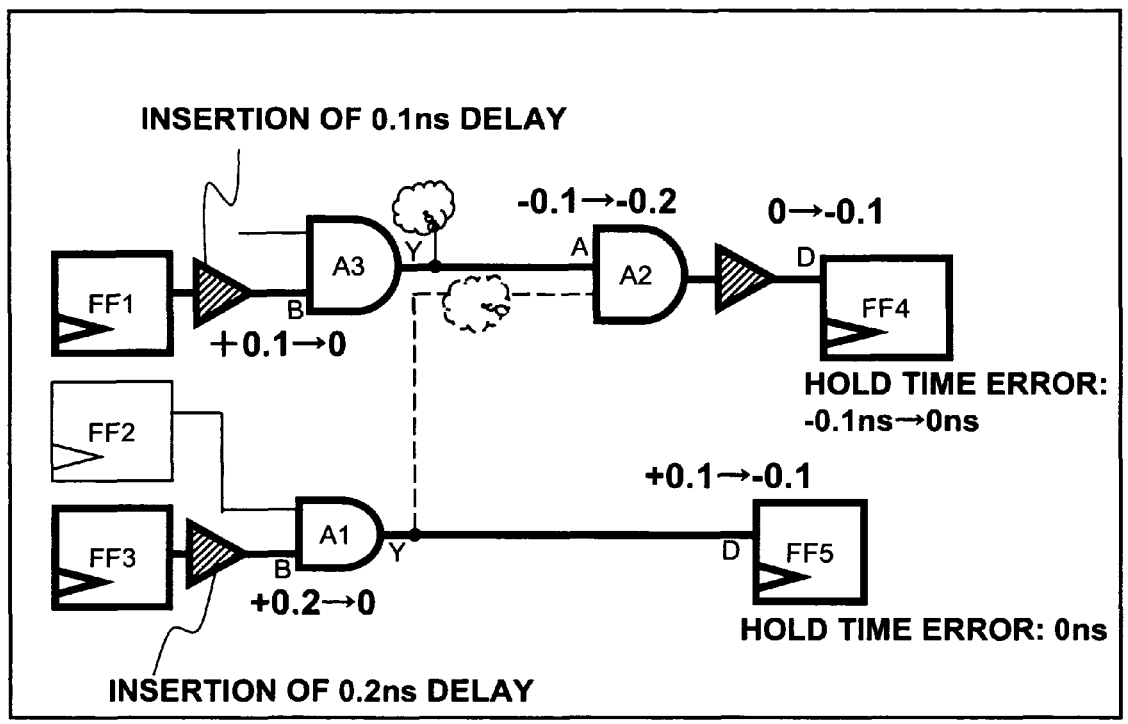
FIG. 14 is a circuit diagram illustrating a second exemplary circuit after three delay circuits have been inserted according to a comparative example of the present invention.

With reference to FIG. 13, in the same way as in the first example of FIG. 9, a 0.2-ns delay element is inserted to a B input terminal of AND gate A1 to achieve convergence of a hold time error in error path 3 and then to achieve convergence of a hold time error in an error path 1. However, in the comparative example, existence of a sharing path (FF3→A1→A2→FF4) that shares its start point (FF3Q) with error path 3 and also shares its end point (FF4D) with error path 1 is neglected and convergence of each of the hold time errors in error path 3 and error path 1 is intended individually. Although a 0.2-ns delay element is inserted to a B input terminal of AND gate A1 in order to achieve convergence of a hold time error in error path 3, it is not considered that insertion of the delay element affects a setup margin value of error path 1 through the sharing path. Contrary to the first example, although a 0.2-ns delay element is inserted to a B input terminal of AND gate A1, a setup margin value at each node along error path 1 does not reflect the insertion. Therefore, since it is determined that there is a 0.2-ns setup margin value at a D input terminal of FF4, a 0.2-ns delay element further is inserted to the D input terminal of FF4. Furthermore, in FIG. 14, it seems that convergence of a hold time error has been achieved by inserting a 0.1-ns delay element to a B input terminal of AND gate A3.

Figure 15:
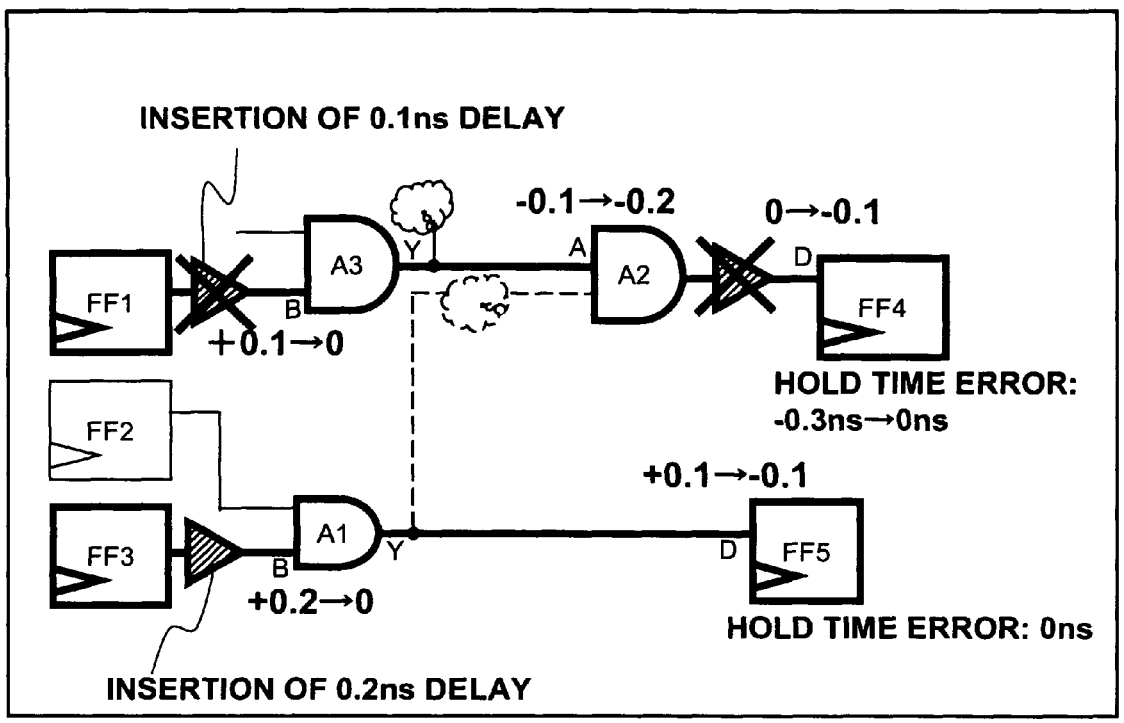
FIG. 15 is a circuit diagram illustrating a second exemplary circuit in which a setup time error has occurred according to a comparative example of the present invention.

However, as shown in FIG. 15, since a sharing path that connect a Y output terminal of AND gate A1 in error path 3 and AND gate A2 in error path 1 is not considered, a setup time error may be caused thorough the sharing path. In order to resolve a hold time error without causing a setup time error, the following procedure is necessary: examine whether there is a sharing path that shares its start point or end point with the error path and also shares its end point or start point with another error path; if there is a sharing path, as shown in FIG. 12B, group the error path with another error path having the sharing path; store the group information; and achieve convergence of the hold time error in accordance with the group information. Note that it is necessary to group an error path with another error path that shares the sharing path with the error path irrespective of whether the sharing path itself is an error path or not. Store information like FIG. 12C, as a mutually influencing node, of a node whose setup margin value is influenced through a sharing path by insertion of a delay element. When a setup margin value is updated, it is necessary to update a setup margin value at a mutually influencing node that is included in another path of the grouped error paths if a node, to which a delay element is inserted, is a mutually influencing node.

SECOND EXAMPLE

An example, where a plurality of delay libraries are used, is explained. For example, when convergence of a hold time error is intended in designing a semiconductor integrated circuit, there is a case where it is necessary to use a plurality of delay libraries. Specifically, when delay libraries under different voltage condition or temperature condition are used, it is necessary to achieve convergence of a hold time error for each and every delay library. It is known beforehand which voltage condition or temperature condition makes convergence most difficult and, if convergence is achieved using a voltage condition or temperature condition that makes convergence most difficult, convergence can be achieved under another voltage condition or temperature condition, which causes no problem. However, since a hold time or setup time is determined by various factors that interrelate in a complex way, it is difficult in reality to predict which condition makes convergence most difficult. In this case, when delay libraries under different voltage condition or temperature condition are used, a delay element should be inserted so as to achieve convergence of a hold time error for each and every delay library. The second example is an example of a method of convergence of a hold time error when a plurality of delay libraries are used in this way and a device therefor.

FIG. 17 is a block diagram illustrating a structure of a device for achieving convergence of a hold time error according to a second example. Specifically, different structure from that of the first example is explained and similar parts to those in the first example are labeled with the same reference numerals for the first example of FIG. 2 and not explained.

Although there is only one delay library 6 in FIG. 2, a plurality of delay libraries 26 with different voltage condition or temperature condition are used in FIG. 17. If a timing constraint condition varies depending on the condition, timing constraint condition 27 is prepared for each condition. In timing analysis unit 1, timing analysis is performed using each delay library 26. When timing analysis using one of the delay libraries 26 causes a hold time error, the condition and the error path are stored in error path list 28. When at least one of the conditions causes a hold time error, a setup margin value at each node along the error path, in which the hold time error occurs in the condition, is determined as setup margin value 29 for all possible combinations of conditions. Delay element insertion unit 23 inserts a delay element so as to achieve convergence of a hold time error for all conditions without causing a setup time error in any condition. Although the same delay element is inserted to the same position irrespective of which delay library is used, a delay value varies depending on each delay library. Setup margin update unit 24 updates a setup margin value for each delay library. Output to non-convergent path list 34 information on in which delay library convergence of a hold time error cannot be achieved.

By way of a concrete example, a processing flow of the second example is explained in more detail. FIG. 18 is a drawing illustrating a result of timing analysis performed on a circuit having seven paths from path 1 to path 7 using delay libraries 1 to 3, which correspond respectively to conditions 1 to 3. FIG. 16 is a flowchart illustrating a method of achieving convergence of a hold time error according to a second example. The example shown in FIG. 18 is explained with reference to the flowchart of FIG. 16. In step S21, timing analysis is performed three times using delay libraries 1 to 3, which correspond respectively to conditions 1 to 3 in FIG. 18. In FIG. 18, a circle indicates that a hold time error does not occur in the condition (delay library) and a cross indicates that a hold time error occurs in the condition.

In step S22 in FIG. 16, if a hold time error occurs for at least one of the delay libraries, the error path is output as error path list 28. In an example shown in FIG. 18, a hold time error occurs in path 1 in condition 1, in path 3 in condition 2, and in paths 3 and 5 in condition 3. List in the error path list a path in which an error occurs in at least one of the conditions (delay libraries). For example, although a hold time error does not occur in paths 3 and 5 in condition 1 (delay library 1), they are listed in the error path list because a hold time error occurs in them in condition 2 or 3.

In step S23, a setup margin value in each error path of the three error paths, paths 1, 3 and 5, which are listed as error paths in step S22, is determined using each of the delay libraries 1 to 3. Although a hold time error does not occur in paths 3 and 5 in condition 1 (delay library 1), setup margin values for paths 3 and 5 are determined also in condition 1 because a setup time error may occur if a delay element is inserted to paths 3 and 5 in order to achieve convergence of hold time errors that occurs in conditions 3 and 5. A setup margin value for a path that becomes an error path for at least one of the delay libraries is determined for the all conditions. Steps S4 to S6 are basically identical to those in the first example. A candidate for grouping in step S4 is a path that becomes an error path in at least one of conditions 1 to 3.

In step S27, examine whether convergence of a hold time error can be achieved for all conditions of the delay libraries. If convergence of a hold time error cannot be achieved in at least one of the condition, it is determined that convergence is impossible. In step S32, insert to the non-convergent path list information on in which delay library convergence is impossible.

In step S28, a delay element is inserted commonly for each delay library so as not to cause a setup time error in any delay library. For example, when a setup margin value in condition 1 is 0.4 ns and the delay per delay element is 0.2 ns, two delay elements can be inserted at a node along path 1 if only condition 1 is considered. However, when a setup margin value at the same position is 0.7 ns in condition 2 and the delay per the same delay element in the condition 2 is 0.4 ns, insertion of the two delay elements causes a setup time error in condition 2.

Therefore, in this case, two delay elements cannot be inserted also in condition 1. And at most one delay element can be inserted. In step S28, insert a delay element having a maximum delay within a setup margin value for all delay libraries. Even when a hold time error does not occur in path 1 for condition 2, it is necessary to insert a delay element to path 1 in order to achieve convergence of a hold time error that occurs in condition 1. Since the circuit is common in conditions 1 to 3, it is necessary to insert a delay element also in conditions 2 and 3 so as not to cause a setup time error.

In step S29, a setup margin value for each delay library is updated. While a delay element to be inserted is common for each delay library, its delay value usually varies for each delay library. In step S30, determine whether convergence of a hold time error for each and every delay library has been achieved. If convergence has not been achieved for at least one of the delay libraries, go back to step S27 and the processing continues until convergence is achieved for all libraries or it becomes clear that a measure cannot be taken for at least one of the libraries. In step S33, conditions of a delay library in which convergence cannot be achieved is also output to the non-convert path list.

Although the explanation has been made assuming that a delay library is prepared for each voltage condition or temperature condition, in addition to use conditions of a circuit such as voltage and temperature, a delay library may be prepared for each delay value which varies due to a manufacturing process at a semiconductor integrated circuit manufacturing factory.

THIRD EXAMPLE

A third example, in which a computer program causes a computer such as an engineering workstation and personal computer to execute each step of the method of achieving convergence of a hold time error according to the first example or second example or a computer program causes a computer to function as a device for achieving convergence of a hold time error according to the first example or second example, is explained.

In the first example of FIG. 2 or second example of FIG. 17, a computer program can cause a processing unit of a computer to function as static timing analysis unit 1, group information analysis unit 2, delay element insertion units 3, 23, and setup margin value update units 4, 24. A computer program can cause at least a part of a main memory unit or auxiliary memory unit to function as a memory unit for storing net list 5, delay libraries 6, 26, timing constraint conditions 7, 27, error path lists 8, 28, setup margin values 9, 29, group information 10, mutually influencing node 11, delay element inserted net list 12, inserted delay element list 13, and non-convergent path lists 14, 34. A program can cause a computer to execute a method of achieving a convergence of a hold time error according to FIG. 1 or FIG. 16.

The program can be installed on a computer through an optical recording medium like a CD or DVD, a magnetic recording medium like a hard disk, a semiconductor recording medium like a flush memory, or the Internet.

In each example explained above, it is not explained in detail in which error path convergence should be achieved preferentially and to which position of a plurality of positions where a delay element can be inserted a delay element should be inserted. A known method, for example as described in Patent Document 1, can be selected for this procedure. For example, a path with a large hold time violation value can be selected as an error path in which convergence is achieved preferentially and an ungrouped error path that can be processed individually can be processed first. However, once a path in which convergence is achieved preferentially is determined, convergence in the path is achieved preferentially until convergence is achieved in the path or it becomes clear that convergence cannot be achieved.

A delay element can be inserted to a node other than a mutually influencing node which affects other error path if a delay element is inserted. As long as a delay element is inserted to a node other than a mutually influencing node, insertion of the delay element does not affect other error path.

Although files for error path lists (8, 28) and setup margin values (9, 29) separate in FIG. 2 and FIG. 17, setup margin value files (9,29) may also function as error path list files (8, 28) because setup margin values (9, 29: specifically, FIGS. 7A and 7B for example) include all information on error path lists (8, 28: for example, FIG. 12A). In this case, error path lists (8, 28) in FIG. 2 and FIG. 17 are merged with setup margin values (9, 29). In FIG. 17, group information analysis unit 2 analyzes group information 10 and mutually influencing node 11 based on a plurality of setup margin value files 29 each corresponds to one of a plurality of delay libraries.

While the invention has been explained in the above with reference to examples thereof, the invention is not limited to structures of the above examples and it goes without saying that the invention includes various changes and modifications that can be done within the scope of the invention by a person skilled in the art.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A method of achieving convergence of a hold time error, the method comprising:
 receiving a netlist of a target circuit;
 listing, using a processor on a computer, error paths in which a hold time error occurs in the target circuit;
 grouping a first error path and a second error path in the error paths, if there is a sharing path that shares its start point with the first error path and also shares its end point with the second error path; and
 inserting a delay element in the netlist of the target circuit without causing a setup time error per the grouped error paths, thereby achieving a convergence of the hold time error.

2. The method of achieving convergence of a hold time error according to claim 1, further comprising:
 obtaining a setup margin value at each node along the error paths; and
 obtaining, for the grouped error paths, a node shared between the sharing path and the first error path and a node shared between the sharing path and the second error path as an intra-group mutually influencing node,
 wherein said achieving a convergence of the hold time error includes:
  updating a setup margin value at each node along an error path that includes the inserted delay element in a same way based on a delay value of the inserted delay element;
  updating a setup margin value at the intra-group mutually influencing node in a same way based on the delay value of the inserted delay element, if the delay element is inserted to the intra-group mutually influencing node; and
  repeating an insertion of the delay element and updating the setup margin value until the hold time error converges.

3. The method of achieving convergence of a hold time error according to claim 2, further comprising performing a timing analysis of the target circuit using a plurality of delay libraries,
 wherein said listing error paths in which a hold time error occurs includes listing an error path in which a hold time error occurs for at least one of the plurality of delay libraries,
 said obtaining a setup margin value includes obtaining a setup margin value for each delay library of the plurality of delay libraries, and
 said achieving a convergence of a hold time error includes:
  inserting, per the grouped error paths, a common delay element to each delay library without causing a setup time error for any delay library and achieving the convergence of the hold time error; and
  for each delay library, updating a setup margin value at each node along an error path that includes the inserted common delay element in a same way based on a delay value of the inserted common delay element, updating a setup margin value at the intra-group mutually influencing node in a same way based on the delay value of the inserted common delay element, if the common delay element is inserted to the intra-group mutually influencing node, and repeating insertion of the common delay element and update of the setup margin value until the hold time error converges for each delay library.

4. The method of achieving convergence of a hold time error according to claim 3, wherein the plurality of delay libraries comprise libraries that model a delay time of a circuit element for designing a semiconductor integrated circuit, each of which models a delay time of the circuit element having a different nature in at least one of a use condition and a manufacturing condition.

5. The method of achieving convergence of a hold time error according to claim 1, wherein said achieving a convergence of the hold time error comprises:
 determining an error path in which a convergence is achieved preferentially among the error paths in which a hold time error occurs;
 achieving the convergence of a hold time error in the error path in which the convergence is achieved preferentially;
 achieving a convergence of a hold time error in another error path included in a same group as the error path in which the convergence is achieved preferentially; and
 achieving a convergence of a hold time error in an error path that is not included in the group.

6. The method of achieving convergence of a hold time error according to claim 5, wherein said achieving a convergence of a hold time error in another error path includes achieving a convergence of a hold time error per error path grouped with the another error path except an error path in which the convergence of a hold time error has been already achieved.

7. A device for achieving convergence of a hold time error, the device comprising:
 a hold time error memory unit that stores an error path in which a hold time error occurs and its associated hold time violation value;
 a setup margin value memory unit that stores a setup margin value at each node along the error path;
 a group information memory unit that stores, as a group information, a first error path and a second error path in the error path, if there is a sharing path that shares its start point with the first error path and also shares its end point with the second error path;
 an intra-group mutually influencing node memory unit that stores, as an intra-group mutually influencing node, a node shared between the sharing path and the first error path and a node shared between the sharing path and the second error path;
 a delay element insertion unit that inserts a delay element, so as to achieve a convergence of a hold time error within the setup margin value at each node; and
 a setup margin value update unit that updates, along with the insertion of the delay element, a setup margin value at each node along an error path to which the delay element is inserted in a same way based on a delay value of the delay element and updates a setup margin value at each node within the intra-group mutually influencing node except a node along the error path in a same way based on the delay value of the delay element, if the delay element is inserted to the intra-group mutually influencing node.

8. The device for achieving convergence of a hold time error according to claim 7, further comprising:
 a net list memory unit that stores a net list of a circuit in which a convergence of a hold time error is targeted; and
 a group information analysis unit that inputs the net list from the net list memory unit and the error path from the hold time error memory unit, obtains the group information and the intra-group mutually influencing node, and outputs the group information to the group information memory unit and the intra-group mutually influencing node to the intra-group mutually influencing node memory unit.

9. The device for achieving convergence of a hold time error according to claim 7, wherein the setup margin value memory unit stores a setup margin value for each of a plurality of delay libraries,
the delay element insertion unit inserts a delay element so as to achieve convergence of a hold time error within the setup margin value at each node for each of the plurality of delay libraries, and
the setup margin update unit updates for each delay library a setup margin value at each node along an error path to which a delay element is inserted along with the insertion of a delay element in the same way based on a delay value of the delay element and updates a setup margin value at each node within the intra-group mutually influencing node except a node along the error path in a same way based on the delay value of the delay element, if the delay element is inserted to the intra-group mutually influencing node.

10. A non-transitory, computer-readable storage medium storing a program for causing a computer to function as the device for achieving a convergence of a hold time error according to claim 7.

11. The non-transitory, computer-readable storage medium of claim 10, wherein the device further comprises:
a net list memory unit that stores a net list of a circuit in which convergence of a hold time error is targeted; and
a group information analysis unit that inputs the net list from the net list memory unit and the error path from the hold time error memory unit, obtains the group information and the intra-group mutually influencing node, and outputs the group information to the group information memory unit and the intra-group mutually influencing node to the intra-group mutually influencing node memory unit.

12. The non-transitory, computer-readable storage medium of claim 10, wherein the setup margin value memory unit stores a setup margin value for each of a plurality of delay libraries,
the delay element insertion unit inserts a delay element so as to achieve convergence of a hold time error within the setup margin value at each node for each of the plurality of delay libraries, and
the setup margin update unit updates for each delay library a setup margin value at each node along an error path to which a delay element is inserted along with the insertion of a delay element in a same way based on a delay value of the delay element and updates a setup margin value at each node within the intra-group mutually influencing node except a node along the error path in a same way based on the delay value of the delay element, if the delay element is inserted to the intra-group mutually influencing node.

13. A non-transitory, computer-readable storage medium storing a program for causing a computer to execute a method of achieving convergence of a hold time error, the method comprising:
listing error paths in which a hold time error occurs in a target circuit;
grouping a first error path and a second error path in the error paths, if there is a sharing path that shares its start point with the first error path and also shares its end point with the second error path; and
achieving a convergence of the hold time error by inserting a delay element in the target circuit without causing a setup time error per the grouped error paths.

14. The non-transitory, computer-readable storage medium of claim 13, wherein the method further comprises:
obtaining a setup margin value at each node along the error paths; and
obtaining, for the grouped error paths, a node shared between the sharing path and the first error path and a node shared between the sharing path and the second error path as an intra-group mutually influencing node,
wherein said achieving a convergence of the hold time error includes:
updating a setup margin value at each node along an error path that includes the inserted delay element in a same way based on a delay value of the inserted delay element;
updating a setup margin value at the intra-group mutually influencing node in a same way based on the delay value of the inserted delay element, if the delay element is inserted to the intra-group mutually influencing node; and
repeating an insertion of the delay element and updating the setup margin value until the hold time error converges.

15. The non-transitory, computer-readable storage medium of claim 14, the method further comprises performing a timing analysis of the target circuit using a plurality of delay libraries,
wherein said listing error paths in which a hold time error occurs includes listing an error path in which a hold time error occurs for at least one of the plurality of delay libraries,
said obtaining a setup margin value includes obtaining a setup margin value for each of the plurality of delay libraries, and
said achieving a convergence of the hold time error includes:
inserting, per the grouped error paths, a common delay element to each delay library without causing a setup time error for any delay library and achieving a convergence of the hold time error; and
for each delay library, updating a setup margin value at each node along an error path that includes the inserted common delay element in same way based on a delay value of the inserted common delay element, updating a setup margin value at the intra-group mutually influencing node in the same way based on the delay value of the inserted common delay element, if the common delay element is inserted to the intra-group mutually influencing node, and repeating insertion of the common delay element and update of the setup margin value until the hold time error converges for each delay library.

16. The non-transitory, computer-readable storage medium of claim 15, wherein the plurality of the delay library are libraries that model delay time of a circuit element for designing a semiconductor integrated circuit, each of which models a delay time of the circuit element having a different nature in at least one of a use condition and a manufacturing condition.

17. The non-transitory, computer-readable storage medium of claim 13, wherein said achieving a convergence of the hold time error comprises:
determining an error path in which a convergence is achieved preferentially among the error paths in which a hold time error occurs;
achieving the convergence of a hold time error in the error path in which convergence is achieved preferentially;
achieving a convergence of a hold time error in another error path included in a same group as the error path in which the convergence is achieved preferentially; and achieving a convergence of a hold time error in an error path that is not included in the group.

18. The non-transitory, computer-readable storage medium of claim 17, wherein said achieving a convergence of a hold time error in another error path includes achieving a convergence of a hold time error per error path grouped with the another error path except an error path in which a convergence of a hold time error has been already achieved.

* * * * *